May 26, 1936.   C. L. EKSERGIAN   2,041,996
DUAL RIM WHEEL
Filed May 27, 1932
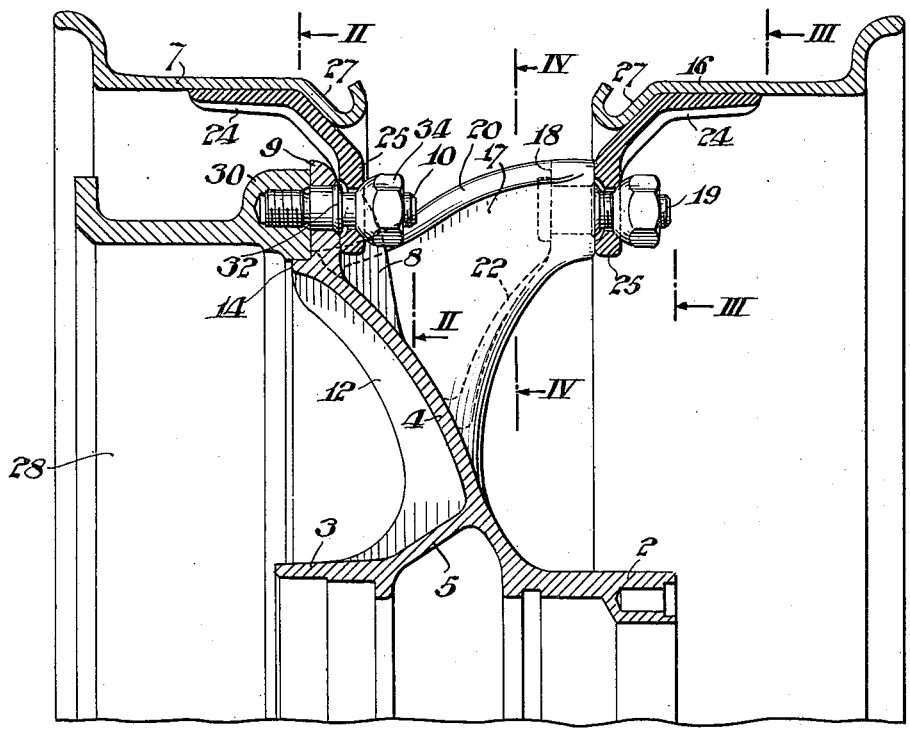
Fig. 1.
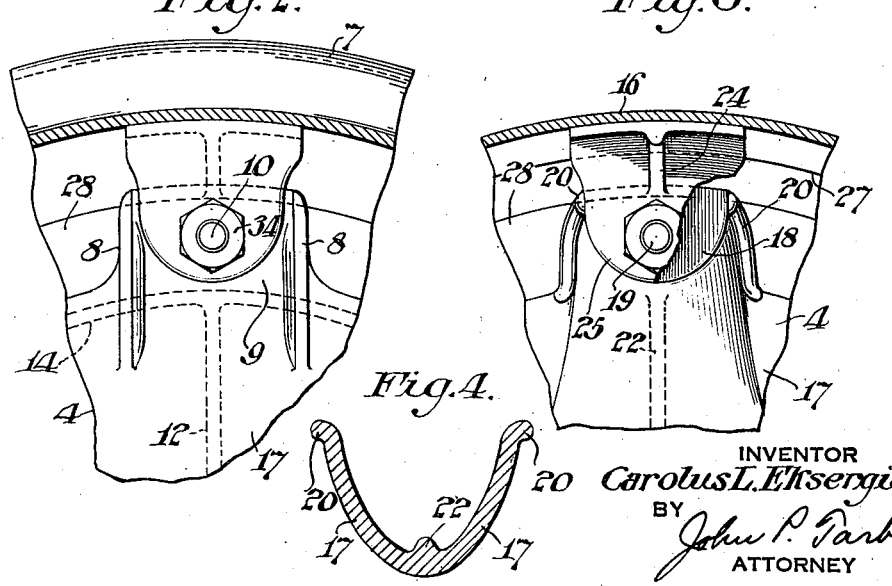
Fig. 2.   Fig. 3.
Fig. 4.
INVENTOR
Carolus L. Eksergian,
BY
John P. Tarbox
ATTORNEY Patented May 26, 1936

2,041,996

UNITED STATES PATENT OFFICE 2,041,996

DUAL RIM WHEEL

Carolus L. Eksergian, Detroit, Mich., assignor to Budd Wheel Company, Philadelphia, Pa., a corporation of Pennsylvania Application May 27, 1932, Serial No. 613,826

9 Claims. (Cl. 301—65)

My invention relates to wheels and particularly to wheels of the dual-rim type for use on heavy truck bodies.

An object of my invention is to provide a cast wheel body of great strength, light weight, symmetrical outline and good casting characteristics.

Another object is to provide for easy mounting and dismounting of dual rims from the outer side of a wheel, to permit the use of duplicate rims, to facilitate the mounting of a rim and a brake drum by a single means, to provide reinforcing ribs, to employ pressed-metal rims having mounting ribs welded thereon, and to obtain other advantages incident to the utilization of the improvement.

In practicing the invention, axially-spaced hub portions are provided, the outer one with an axially-inwardly diverging conical body and the inner one with an axially outwardly diverging cone intersecting the body between its inner and outer perimeters.

Perimetrically-spaced radial portions or arms, either radially ribbed or of channel section, or both, are disposed on the conical body and alternately provided with axially-offset rim-mounting portions to receive both the inner and outer rims from the outer side of the wheel and to permit these rims to be duplicates.

The ribs and channel sections are so constructed and related to each other and to the cone and hub portions as to provide substantially maximum strength, with substantially a minimum of material and weight, as well as to facilitate manufacture and to render the device of ornate contour.

Other features of improvement are more specifically set forth in connection with the drawing and the following specification.

Fig. 1, of the drawing, is a view, partially in axial section and partially in elevation, of one-half of a wheel embodying my invention, Figs. 2 and 3 are views of perimetrically-spaced portions of the wheel substantially as seen normal to offset axial sections indicated by lines II—II and III—III, respectively, of Fig. 1, and Fig. 4 is a detail view, in section along the line IV—IV of Fig. 1, of a front rim-supporting element.

An outer hub portion 2, axially spaced from an inner hub portion 3, has a curved conical body portion 4 diverging axially inwardly therefrom and intersected, between its inner and outer perimeters, by a cone 5 diverging axially outwardly from the inner hub portion 3.

Confined within a relatively short radial space adjacent to the outer perimeter of the body 4, perimetrically-spaced elements for supporting an inner rim 7 are of substantially channel section including side walls 8 and outer end walls 9 substantially forming arms having axial openings for the reception of bolts 10. Axial-plane radial ribs 12 are associated with the substantially conical body 4 at the centers of portions thereof constituting the bottoms of the channels, of which the ribs 8 are the sides and the walls 9 are the outer ends. The ribs or channel side walls 8 merge at the inner ends thereof into the outer sides of the conical body. Shoulders 14, at the inner sides of the walls 9, are, in effect, continuations of the conical body and are supported by the ribs 12.

Perimetrically-spaced radial elements or arms, for supporting an outer rim 16, are also, of substantially channel section including side walls 17, outer end walls 18 having axial openings for the reception of bolts 19, top edge flanges or beads 20 and a radial inside mid-rib 22.

The walls 9 and 18 are alternately perimetrically and axially offset so that the rims 7 and 16 may both be placed in, and removed from operative position relative to the wheel, from the outside of the latter. The arrangement of parts is also such as to permit the rims to be duplicate, that is, either one may be placed in the position of the other by turning it slightly about the wheel axis so that lugs or ears 24 thereon register with the proper bolt-receiving walls 9 or 18.

The lugs 24 comprise body portions of centrally ribbed, channel or other section, welded or otherwise secured to the under sides of the rims, and apertured ears 25 for mounting on the bolts 10 and 19. The particular combination wherein the ribbed lugs 24 conform to the bottom perimetral sides of the rims and the axially-sloping locking-ring gutter portions 27 thereof, and have the support thereof on the rim bolts radially opposite these parts, provides great strength and permits the elements to be of light weight.

A brake drum 28 has an inner perimetral flange conforming to the shoulder 14, on which it is disposed, and tapped bosses 30 for the reception of the bolts 10. The latter have flanges 32 by which the brake drum is secured to the walls 9 and may remain in position while the inner rim 7 is being renewed or replaced by the removal of nuts 34. That is, the bolts 10 are first turned to position, in which the brake drum and the body are held together by the threads and the flanges 32, after which, by manipulation of the nuts 34, the rim may be removed or replaced, without disturbing the relation between the brake drum and the body.

The arrangement of the substantially conical portions 4 and 5 provides great radial strength, as well as rendering the hub and adjacent body parts of good casting characteristics. The radial channel or ribbed construction of the rim mountings, their relation to the cone and to the closed channel ends 9 and 18, and other factors, contribute to the production of a cast wheel body of unusual strength and light weight, besides facilitating the assembly of the parts.

The shorter inner-rim mounting portions are reinforced by the main cone ribs 12. The larger outer rim mounting carrying portions are of spout-like character, reinforced along the top or outer edges, by the flanges 20, and, along the center bottom wall, by the ribs 22. The major base, or inner ends, of the outer rim mounting carrying portions extend radially over substantial portions of the outer surface of the substantially conical body 4. This construction, in combination with the ribbed body cone, the cone 5 and other parts, has been provided with a particular view to providing maximum strength for a minimum amount and weight of material, good casting characteristics, facility of assembling the parts and other advantages.

The structure is neat and compact, lends itself to clean-cut artistic lines and is an improvement generally in the dual-rim, cast-wheel art.

While I have shown and described a particular form of my invention, changes may be effected therein without departing from the spirit and scope thereof, as set forth in the appended claims.

What I claim is:

1. A dual-rim wheel comprising a substantially conical body portion, perimetrically-spaced alternately axially-offset rim-mounting portions thereon and reinforcing substantially axial-plane ribs extending substantially radially along the substantially conical body portion opposite the rim-mounting portions.

2. A dual rim wheel comprising a substantially conical body portion and perimetrically-spaced substantially radial arms of substantially channel-section thereon said arms being alternately axially-offset to provide axially spaced rim-mounting portions.

3. A dual-rim wheel comprising a conical body portion and perimetrically-spaced elements of substantially channel-section being alternately axially-offset and having consecutive axially spaced rim-mounting end walls.

4. A cast metal wheel body for dual type wheels comprising a hub portion, an angularly extending substantially conical interrupted main body portion providing a plurality of circumferentially spaced rim securing portions axially offset from the plane of the wheel, and a plurality of spout-like portions projecting axially and radially outwardly from the interrupted portions of said main body and providing substantially radially extending rim securing portions axially offset from the plane of the wheel body, and circumferentially offset as regards said rim securing portions on the main body, and radially extending rib portions reinforcing said wheel body throughout the substantially axially extending offset parts thereof.

5. A dual rim wheel comprising a hub, a substantially conical body diverging rearwardly from the hub, a series of peripherally spaced rear rim mounting portions adjacent to the outer periphery of said body, and a series of peripherally spaced front rim mounting portions axially spaced forwardly of said rear series, said front rim mounting portions being of spout-like character having extensive bases opening into said body peripherally between said rear mounting portions.

6. A dual rim wheel comprising a hub, a substantially conical body diverging rearwardly from the hub, a series of peripherally spaced rear rim mounting portions adjacent to the outer periphery of said body, and a series of peripherally spaced front rim mounting portions axially spaced forwardly of said rear series, said front rim mounting portions being of spout-like character having extensive bases opening into said body peripherally between said rear mounting portions and ribs along the throats of the spouts.

7. A dual rim wheel comprising a main conical body portion, a series of peripherally spaced channel section front rim mounting portions integrally emanating from said conical body portion, and a series of peripherally spaced rear rim mounting portions axially spaced rearwardly of said front series, the portions of said rear series being of substantially radially extending peripheral channel section, also integrally emanating from said conical body portion and circumferentially spaced relative to the front rim mounting portions.

8. A dual rim wheel comprising a body, a series of peripherally spaced front rim mounting portions, and a series of peripherally spaced rear rim mounting portions axially spaced rearwardly of said front series, the portions of said rear series being of substantially radially extending peripheral channel section at the front side of the body and having ribs opposite the channels at the rear side of the body.

9. A wheel body comprising a hub, a substantially conical body and a series of peripherally spaced rim mounting portions of spout-like character having extensive bases opening into the side of the body and upstanding thereon substantially normal thereto, said spout-like portions having rim receiving seats arranged in a wheel plane across the mouths of the spouts, and the tops of the spout-like portions being open, and a second series of peripherally spaced rim mounting portions emanating from said conical body and offset axially from said first series, the mounting portions of the second series being circumferentially spaced relative to the mounting portions of the first series.

CAROLUS L. EKSERGIAN.